United States Patent [19]

Oonishi

[11] 4,293,911

[45] Oct. 6, 1981

[54] ELECTRONIC CASH REGISTER WITH FACILITIES OF STORING MERCHANDISE INFORMATION

[75] Inventor: Souichi Oonishi, Yao, Japan

[73] Assignee: Sharp Kabushiki Kaisha, Osaka, Japan

[21] Appl. No.: 60,191

[22] Filed: Jul. 24, 1979

[30] Foreign Application Priority Data

Jul. 24, 1978 [JP] Japan .............................. 53-90666

[51] Int. Cl.³ .......................................... G06F 13/06
[52] U.S. Cl. .................................... 364/405; 364/900
[58] Field of Search ...................... 364/405, 404, 900

[56] References Cited

U.S. PATENT DOCUMENTS

| | | | |
|---|---|---|---|
| 3,330,947 | 7/1967 | Alpert et al. | 364/405 |
| 3,356,836 | 12/1967 | Stenby | 364/710 |
| 3,710,085 | 1/1973 | Brewer et al. | 364/404 |
| 3,748,452 | 7/1973 | Ruben | 364/405 |
| 3,898,396 | 8/1975 | Gushue et al. | 179/175.3 A |
| 4,144,567 | 3/1979 | Tadakuma et al. | 364/405 |
| 4,159,533 | 6/1979 | Sakurai | 364/900 |
| 4,172,285 | 10/1979 | Yoshida et al. | 364/443 |
| 4,185,170 | 1/1980 | Morino et al. | 179/1 SM |
| 4,211,892 | 7/1980 | Tanimoto et al. | 179/1 SM |

FOREIGN PATENT DOCUMENTS 2818370  11/1978  Fed. Rep. of Germany ... 179/1 SM

OTHER PUBLICATIONS

Chapman; "Prospectives in Voice Response From Computers"; Proc. of Int'l Conf. on Communications; 1970, pp. 45-1 to 45-8.

*Primary Examiner*—David H. Malzahn
*Attorney, Agent, or Firm*—Birch, Stewart, Kolasch & Birch

[57] ABSTRACT

An electronic cash register adapted for storing commodities information such as price information, group information, tax information, and the like comprises a first generator, a code generator, a second generator, and memory means. The first generator is provided for developing first control signals indicative of the initiation of the introduction of the commodities information. The code generator is responsive to the control signals for developing a first series of code signals indicative of identification signals for the commodities information in connection with a first article. The second generator is provided to generate second control signals indicative of some type of the commodities information with respect to the first article so that the code generator is responsive to the second control signals for developing a second series of the code signals representative of the identification signals for the commodities information in connection with a second article. The memory means is provided for storing the first and second series of the code signals developed from the code generator, and the second control signals developed from the second generator. Thus, the system sequentially generates the code numbers and allows the operator to enter price, tax, and product group information corresponding to that group number. When this information is entered, a new code number is generated. The system reduces commodities information errors by eliminating the need for operator programming of the code numbers.

6 Claims, 4 Drawing Figures

ELECTRONIC CASH REGISTER WITH FACILITIES OF STORING MERCHANDISE INFORMATION

BACKGROUND OF THE INVENTION

The present invention relates in general to an electronic cash register and, more particularly, to such an electronic cash register for storing merchandise information such as price, classification, taxation, or other similar data by means of simple operations.

More recent electronic cash registers have evolved which incorporate a price look-up (PLU) function for enhancing the performance of the registers. The term "price look-up (PLU) function" used herein means that all merchandise information such as price, classification covering related commodities, taxable articles or not, and the like is preliminarily stored within an electronic cash register.

The merchandise information is recalled from a memory and applied to the output of the electronic cash register each time the electronic cash register is energized for causing register operations in connection with the respective commodities. Price look-up codes are utilized for identifying the respective merchandise information. In addition to the price look-up codes, the number of the registered commodities need only be admitted to the electronic cash register to complete the register operations.

Such price look-up functions are typically set forth in detail in Japanese Publication No. 53-12431 published May 1, 1978, by N.C.R. corporation.

With this type of the electronic cash registers, if the merchandise or commodities information to be registered has increased greatly, it took a lot of times and procedures to fully store the commodities information into the memory for the price look-up function. In fact, the commodities information must be updated. Therefore, there has been a great desire to simplify the procedures for registering the commodities information.

OBJECTS AND SUMMARY OF THE INVENTION

Accordingly, it is a principal object of the present invention to provide an improved electronic cash register for containing merchandise or commodities information by means of simplified and speedy procedures for storing price Look-up (PLU) information.

It is another object of the present invention to provide an improved electronic cash register where price look-up (PLU) codes for a price look-up (PLU) function are automatically developed with simplified and speedy procedures.

It is still another object of the present invention to provide an improved price look-up (PLU) system for implementing a price look-up (PLU) function using particular codes. Commodities information related to the particular codes is displayed on a display for securing the introduction of the information.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic cash register adapted for storing commodities information such as price information, classification information, tax information, and the like comprises a first generator, a code generator, a second generator, and memory means.

The first generator is provided for developing first control signals indicative of the initiation of the introduction of the commodities information. The code generator is responsive to the control signals for developing a first series of code signals indicative of identification signals for the commodities information in connection with a specific article. The second generator is provided to generate second control signals indicative of an additional portion of the commodities information of the respective specific article so that the code generator is responsive to the second control signals for developing a second series of the code signals representative of the identification signals for the commodities information in connection with another article.

The memory means is provided for storing the first and second series of the code signals developed from the code generator, and the second control signals developed from the second generator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

The present invention is mainly directed to an electronic cash register for implementing a price look-up (PLU) function. The term "price look-up (PLU) function" as used in this specification means that commodities information such as price, product groups covering related commodities, taxable articles or not, and the like is preliminarily stored within a memory of the electronic cash register. The term "price look-up" is referred to as PLU hereinbelow.

More particularly, the present invention is limited to a memory circuit of the electronic cash register for containing PLU information, not to a reading-out circuit for taking out the stored PLU information. Therefore, such a reading-out circuit is omitted from the drawings since it is well-known to those skilled in the art.

Figure 1:
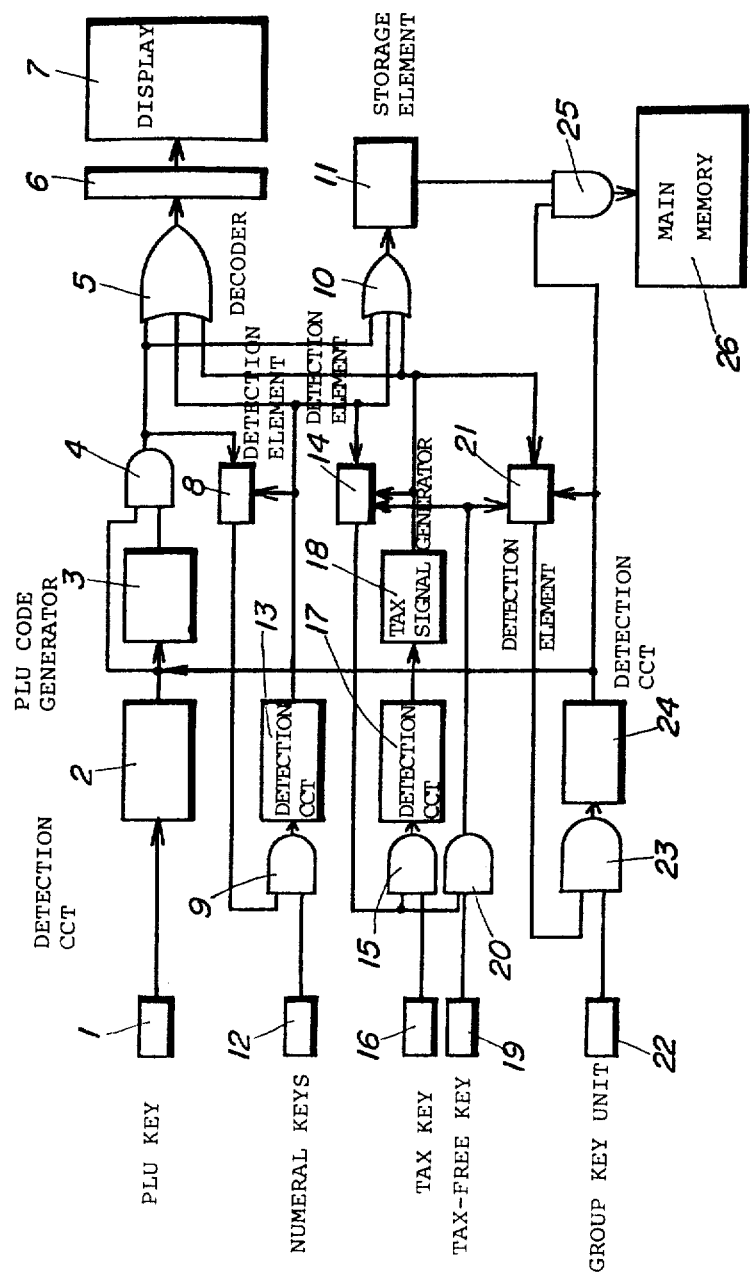
FIG. 1 is a block diagram of an electronic cash register according to the present invention.

With reference to FIG. 1, there are provided within an electronic cash register of the present invention a PLU key 1, a plurality of numeral keys 12, a tax key 16, a tax-free key 19, a group key unit 22. There are further contained within the electronic cash register a plurality of detection circuits 2, 13, 17 and 24 all connected to the PLU key 1, the numeral keys 12, a set of the tax key 16 and the tax-free key 19, and the group key unit 22.

There are connected a PLU code generator 3, a tax signal generator 18, three detection elements 8, 14 and 21, a decoder 6, a display 7, a storage element 11, a main memory 26, two OR gates 5 and 10, and a plurality of AND gates 4, 9, 15, 20, 23 and 25.

The above stated circuit elements will be explained with reference to a flow chart of FIG. 3 and displays of FIG. 4, in which case the commodities information is stored.

Figures 2, 3:
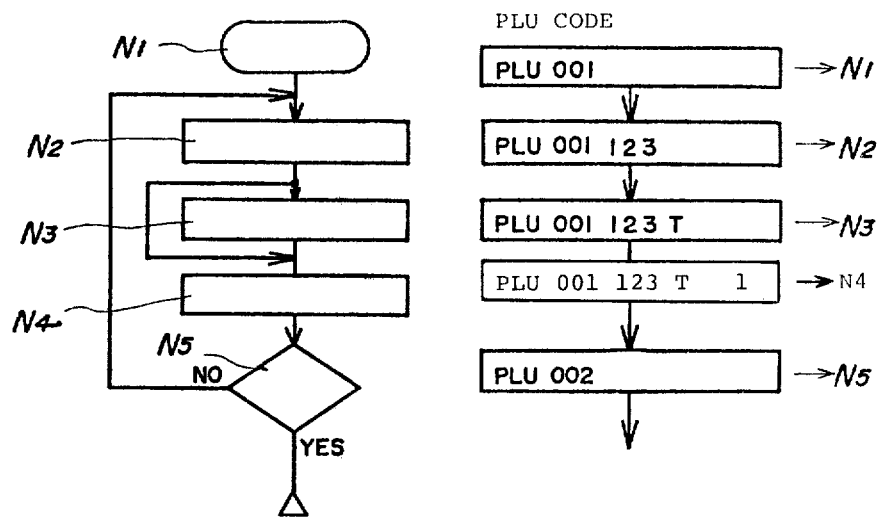
FIG. 2 is a flow chart for storing commodities information into the electronic cash register shown in FIG. 1.
FIG. 3 is a plurality of displays indicated in a display contained within the electronic cash register in connection with respective steps in the procedure shown in FIG. 2.

Just before the related commoditied information is introduced into the electronic cash register, the PLU key 1 is actuated to execute an $N_1$ step in the flow chart shown in FIG. 2. Key signals from the PLU key 1 are admitted into the detection circuit 2. The detection circuit 2 is responsive to the key signals for generating signals in a certain level, for example, a high level applied to the PLU code generator 3 and the AND 4. Upon the introduction of the signals in the high level to the PLU code generator 3, the PLU code generator 3 delivers a first series of PLU code signals which are entered into the decoder 6 through the AND gate 4 and the OR gate 5, whereby the display 7 indicates "PLU 001," for example. At the same time, output signals from the AND gate 4 make the detection element 8 set, thereby generating a high signal, so that output signals from the detection element 8 allow the AND gate 9 to become conductive. The output signals from the AND gate 4 are temporarily stored within the storage element 11 through the OR gate 10.

Thereafter, the numeral keys 12 are actuated for providing price information as the commodities information. This is related to an $N_2$ step in the flow chart shown in FIG. 2. The price information is applied to the detection circuit 13 through the AND gate 9. The price information is then indicated within the display 7 with the aid of the OR gate 5 and the decoder 6.

At the same time, output signals from the detection circuit 13 force the detection element 8 into the reset or low state to thereby prevent the conductance of the AND gate 9. On the other hand, the output signals from the detection circuit 13 allow the detection element 14 to be set, thereby generating a high signal and placing the AND gates 15 and 20 in conductive conditions. The output signals from the detection circuit 13 are representative of the applied price information and are introduced into and transiently stored within the storage element 11 with the help of the OR gate 10.

Subsequently, according to whether or not the related article is dutiable, either of the tax key 16 and the tax-free key 19 is energized which is defined as an $N_3$ step in the flow chart of FIG. 2. Assuming that the tax key 16 is actuated, the detection circuit 17 receives key signals from the tax key 16 through the AND gate 15. The detection circuit 17 activates the tax signal generator 18 so as to deliver tax indicative signals. The tax indicative signals from the tax signal generator 18 are entered into the display 7 with the aid of the OR gate 5 and the decoder 6, whereby a tax representative indication such as "T" is enabled in the display 7.

At that time, the tax indicative signals from the tax signal generator 18 cause the detection element 14 to be reset or return to a low state, so that the two AND gates 15 and 20 are turned closed. The detection element 21 is set by means of the tax indicative signals from the tax signal generator 18 and thus generates a high signal so as to place the AND gate 23 in a conductive condition.

The tax indicative signals are applied to and temporarily contained within the storage element 11.

On the other hand, if the tax-free 19 is actuated to thereby generate key signals which are applied to the detection elements 14 and 21 through the AND gate 20, the detection element 14 is reset to thereby make the AND gates 15 and 20 nonconductive. The detection element 21 is then set to thereby enable the AND gate 23 conductive.

Thereafter, the group key unit 22 is energized to announce a group to which the related article belongs, in which case an $N_4$ step in the flow chart of FIG. 2 occurs. The related article is identified with reference to the first series of the PLU code signals which are indicated with the display 7. Key signals from the group key unit 22 are introduced into the detection circuit 24 through the AND gate 23 to determine the applied group. The detection circuit 24 provides group identifying signals applied to the AND gate 25 to cause it conductive. Hence, the contents within the storage element 11 are transmitted to the main memory 26 for storing purposes.

The group identifying signals from the detection circuit 24 are admitted into the detection element 21 to reset the detection element 21 and simultaneously to the PLU code generator 3 so as to indicate that a first series of the commodities information are completely stored in the main memory 26. The first series of the commodities information related to the first series of the PLU code signals.

This is related to an $N_4$ step in the flow chart shown in FIG. 2.

As a result, the PLU code genertor 3 delivers a second series of the PLU code signals relevant to a second series of the commodities information for a second article. The second series of the PLU code signals "PLU 002" are indicated within the display 7 in the same manner as mentioned above.

Thereafter, the respective steps $N_2$ to $N_5$ shown in FIG. 2 are conducted in conjunction with the second series of the commodities information as described above. For example, it is assumed that the number of the articles, the commodities information of which should be introduced into the main memory 26, is 100. The respective PLU code signals are defined as from "PLU 001" to "PLU 100," in which case the respective steps $N_1$ to $N_5$ are effected. It can be set in the PLU code generator 3 that if and when the overall steps $N_1$ to $N_5$ are completed in connection with the final PLU code signals of "PLU 100," all the procedures information into the main memory 26 should be terminated. In such a case, just after the $N_5$ step with respect to the final PLU code signals are conducted, all the procedures for the overall commodities information are finished.

FIG. 3 shows various types of displays indicated in the display 7 in connection with the respective steps $N_1$, $N_2$, $N_3$, $N_4$ and $N_5$ shown in FIG. 2.

As stated above, the PLU code generator 3 is constructed so that it develops automatically the first series of the PLU code signals in response to the actuation of the PLU Key 1 in the $N_1$ step and then the second series of the PLU code signals in response to the actuation of the group key unit 22 in the $N_4$ step. The actuation of the group key unit 22 indicates that the commodities information in connection with the article relevant to the actuated group key unit 22 has been just stored.

It is not necessary that the PLU code signals should be introduced with the use of external input means. This simplifies the introduction of the commodities information and makes it speedy.

Figure 4:
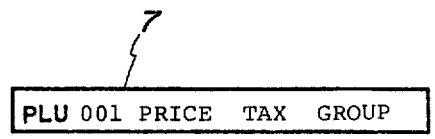
FIG. 4 is another display indicated in the display.

FIG. 4 shows another example of a display caused in the display 7 in accordance with a certain series of the PLU code signals. With reference to FIG. 4, the display 7 indicates instructions that the price information, the tax information, and the group information are to be introduced as the commodities information in addition to the predetermined PLU code signals. This display pattern can be obtained by appropriately modifying the decoder 6 as control means. The indicated instructions for the price information can be changed to the price information introduced by means of the numeral keys 12 and the detection circuit 13. It may be required that the decoder 6 as the control means is arranged so as to cause the display for the introduced price information in place of the indicated instructions for the price information. The other instructions for the tax information and the group information are kept displayed.

The decoder 6 as the control means should also be altered so that it causes the display for the tax information until the tax information is applied to the display 7 with the use of either of the tax key 16 and the taxfree key 19. This kind of the alternation of the decoder 6 may be made for the group information.

This means that the commodities information is introduced with reference to the display contents provided on the display 7. This can further reduce the occurrence of errors in entering the commodities information to the main memory 26. High efficiency and immediate completion can be further obtained in the introduction of the commodities information.

While only certain embodiments of the present invention have been described, it will be apparent to those skilled in the art that various changes and modifications may be made therein without departing from the spirit and scope of the invention as claimed.

What is claimed is:

1. A system for loading commodities information onto a memory of an electronic cash register, said system comprising:
   means for sequentially producing code signals and for providing each of these signals to an operator, each of said code signals being representative of an item of merchandise; and
   input means for entering data representative of commodities information into the memory, said commodities information being identified in the memory by its associated code signal received from said means for sequentially producing and providing representative of the item of merchandise said commodities information describes;
   said means for sequentially producing and providing including means for incrementing a current code signal after the completion of entry of the data corresponding to the current code signal by said input means to produce a new code signal.

2. The system of claim 1, wherein said means for sequentially producing and providing includes a display allowing the operator to view said code signals produced by said means for sequentially producing and providing and said commodities information entered by said input means.

3. The system of claim 1, wherein said input means includes a plurality of generators for producing commodities information.

4. The system of claim 1 or 3, wherein said commodities information includes price information.

5. The system of claim 1 or 3, wherein said commodities information includes group information.

6. The system of claim 1 or 3, wherein said commodities information includes tax information.

* * * * *